US006357213B1

(12) United States Patent
Dillingham (10) Patent No.: US 6,357,213 B1
(45) Date of Patent: Mar. 19, 2002

(54) WATER VEGETATION REMOVAL SYSTEM

(76) Inventor: Mark L. Dillingham, 136 Oleander, West Monroe, LA (US) 71291

( * ) Notice: Subject to any disclaimer, the term of this patent is extended or adjusted under 35 U.S.C. 154(b) by 0 days.

(21) Appl. No.: 09/593,387

(22) Filed: Jun. 14, 2000

(51) Int. Cl.$^7$ ............................................. A01D 44/00
(52) U.S. Cl. ................................................. 56/8; 56/9
(58) Field of Search ......................... 56/9, 8, 1, 16.4 R; 37/57

(56) References Cited

U.S. PATENT DOCUMENTS

| 319,352 A | * | 6/1885 | Trahern | 56/8 |
|---|---|---|---|---|
| 3,498,033 A | * | 3/1970 | Huff | 56/9 |
| 3,546,858 A | * | 12/1970 | Chaplin | 56/9 |
| 3,596,444 A | * | 8/1971 | Beattie | 56/9 |
| 4,248,033 A | | 2/1981 | Bryant | |
| 4,258,534 A | | 3/1981 | Bryant | |
| 4,942,722 A | * | 7/1990 | Desrosiers | 56/8 |
| 5,069,023 A | * | 12/1991 | Prochaska, Sr. | 56/9 |
| 5,207,901 A | * | 5/1993 | Ravagnan | 210/173 |
| 5,481,856 A | * | 1/1996 | Wickoren et al. | 56/9 |
| 5,487,258 A | | 1/1996 | McNabb | |
| 5,542,240 A | * | 8/1996 | Snider et al. | 56/8 |
| 6,041,527 A | * | 3/2000 | Hostetler | 37/345 |

OTHER PUBLICATIONS

John M, Humber Work Boats Ltd, 12" Self Manoveuring Cutter Suction Dredger, No Date.*

* cited by examiner

Primary Examiner—Robert E. Pezzuto
Assistant Examiner—Árpád F. Kovács
(74) Attorney, Agent, or Firm—Richard C. Litman (57) ABSTRACT

The water vegetation removal system includes a stationary barge and at least one motorboat equipped with a plow blade or vegetation rake for plowing vegetation on the surface of a body of water into the vicinity of the barge. The system includes a barge with a diesel engine mounted at one end and a pump box attached to the barge which provides a water-tight chamber for housing a dredge pump powered by the engine. A hopper box with a spillway gate which may be lowered to admit water is attached to the pump box. A water tray is formed by a pair of walls hingedly attached to the hopper box to funnel vegetation into the hopper box. Vegetation is drawn into the water tray and hopper box by suction applied by an intake pipe from the dredge pump which extends into the hopper box. Vegetation is drawn into the pump and macerated, then discharged through a flexible discharge pipe to the shore for transport.

18 Claims, 7 Drawing Sheets

WATER VEGETATION REMOVAL SYSTEM

BACKGROUND OF THE INVENTION

1. Field of the Invention

The present invention relates generally to the removal of problematic aquatic vegetation from a body of water, and in particular, to a stationary barge apparatus and problematic aquatic vegetation removal system for the removal of problematic vegetation, such as water hyacinth, salvinia, water lily and other aquatic vegetation.

2. Description of Related Art

The water hyacinth (*Eichhornia crassipes*), indigenous to South America, and commonly found in tropical and subtropical fresh water bodies of the world, such as California, Florida, Texas, and the Gulf Coast region of the United States, is a typical free-floating or shallow rooted water plant. As one of the fastest growing plants in the world, the hyacinth can completely cover small fresh water lakes, harbors, canals, sloughs, and other essentially occluded fresh water bodies. During the summer months, the climate in much of the Southern United States is ideal for water hyacinth growth, often to the dismay of swimming, boating, and fishing enthusiasts, as well as to the dismay of those in the business of navigating through shallow waterways. Water hyacinths typically deposit in excess of 500 tons of decaying plant material on the bottom per year, and under optimum growing conditions, can cover a surface area that doubles about every ten to fifteen days.

The leaves of the water hyacinth are large and broadly lance-like, extending from a generally inflated stalk, and the flowers are generally blue, violet or white. The leaf blades may be up to 8 inches long and 2–6 inches wide, and the roots are dark and fibrous. The plant reproduces either by seed or fragmentation.

Giant salvinia (*Salvinia molesta*) is an aquatic fen classified as a Federal Noxious Weed and prohibited in the United States by Federal law. Although native to South America, it has been introduced to several countries around the world, and notably has caused severe economic and ecological problems in New Zealand, Australia and South Africa. The weed is currently infesting sites in Texas, Louisiana, Florida, and several other states. Salvinia invades lakes, streams, ponds, and bayous, spreading aggressively by vegetative fragments. Salvinia forms floating mats that shade and crowd out important native plants. Thick mats reduce oxygen content and degrade water quality for fish and other aquatic organisms and impede boating, fishing, and swimming. The mats also clog water intakes needed for the generation of electrical power and for irrigation. Salvinia has a very high growth rate and can double its biomass in less than a week under favorable conditions.

Where removal has been undertaken, harvesting has been performed by non-stationary barges which are typically self-powered machines that must navigate through, grind, bail, and/or contain the water vegetation. The biggest disadvantage of these vessels is the difficulty they encounter in navigating through shallow or obstructed water bodies, such as those replete with natural obstacles like fallen trees, and/or stumps. A harvesting barge which may be operated in a stationary mode is described in U.S. Pat. No. 4,258,534, issued to C. B. Bryant on Mar. 31, 1981. The barge has booms, pontoons and deflectors for defining a throat to direct the flow of vegetation, a pickup conveyor with a mesh belt partially submerged in the throat, a discharge conveyor for discharging the vegetation onto dry land or other barges, a pump with an inlet disposed behind the mesh belt of the pickup conveyor for providing suction to draw vegetation into the throat, and pump outlets connected by hoses to outlets positioned at the ends of the booms to direct the flow of vegetation into the throat and to cause turbulence to break up clumps of vegetation. Evidently the pump used in the '534 device is not a dredge pump, as the vegetation is not transported through the pipes, but by conveyor belts. The '534 patent also does not teach the use of motorboats or Jon boats to direct the vegetation towards the throat. U.S. Pat. No. 4,248,033, also issued to Bryant on Feb. 3, 1981, describes a mobile harvesting barge propelled by paddle wheels for navigation through shallow water. U.S. Pat. No. 5,487,258, issued to T. J. McNabb on Jan. 30, 1996, discloses a non-stationary barge which pulls hyacinth from the water by a conveyor having runners, then grinds the hyacinth to a fibrous biomass, bales the biomass and connects the buoyant bales by rope so that they can be pulled to shore for further processing. Non-stationary barges often have multiple moving parts associated with propulsion and navigation systems which can result in harvest interruption, transit time loss, inability to access certain areas, equipment failure, and considerable expense. Thus, self-powered non-stationary harvesting machines have previously not been generally very economical.

Chemical controls have also been tried. Unfortunately, these techniques have undesirable side effects particularly during the summer months when hyacinth growth is at its peak. Herbicides can be toxic to humans, wildlife, beneficial vegetation, crops and the like, and have been proven to be costly and generally ineffective. Floating aquatic vegetation that has been chemically treated results in a decay process that depletes oxygen from the water, reduces fish stock, and harms the ecosystem.

The prior art fails to teach a stationary surface water vegetation removal apparatus and system as described herein. None of the above inventions or patents, taken either singly or in combination, is seen to describe the instant invention as claimed.

SUMMARY OF THE INVENTION

The water vegetation removal system includes a stationary barge and at least one motorboat equipped with a plow blade or vegetation rake for plowing vegetation on the surface of a body of water into the vicinity of the barge. The system includes a barge with a diesel engine mounted at one end and a pump box attached to the barge which provides a watertight chamber for housing a dredge pump powered by the engine. A hopper box with a spillway gate which may be lowered to admit water is attached to the pump box. A water tray is formed by a pair of walls hingedly attached to the hopper box to funnel vegetation into the hopper box. Vegetation is drawn into the water tray and hopper box by suction applied by an intake pipe from the dredge pump which extends into the hopper box. Vegetation is drawn into the pump and macerated, then discharged through a flexible discharge pipe to the shore for transport.

Accordingly, it is a principal object of the invention to provide a system to remove water hyacinth and other problematic floating aquatic vegetation from occluded shallow bodies of water, by macerating the vegetation and then pumping the mulched vegetation onto nearby dry land through a flexible, preferably transparent, discharge hose for disposal.

It is another object of the invention to provide a barge and pumping apparatus that is relatively light-weight and can be conveniently deployed in areas otherwise inaccessible to self-propelled barges.

It is a further object of the invention to provide a stationary barge apparatus that utilizes a pump with extended drawing chambers, spillway and discharge hose which permits an relatively uninterrupted flow of harvested water vegetation from the water surface to a shore area.

Still another object of the invention is to incorporate a light-weight plow means in cooperation with the barge apparatus to form a convenient system that serves the above purposes.

It is an object of the invention to provide improved elements and arrangements thereof in an apparatus for the purposes described which is inexpensive, dependable and fully effective in difficult environments, and in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a system designed to remove problematic water vegetation, i.e. water hyacinth, salvinia, water lily, and other floating aquatic vegetation, from a body of water by macerating the vegetation into a mulch, and pumping the mulch onto nearby dry land through a flexible, preferably transparent, discharge hose for disposal.

Figure 1:
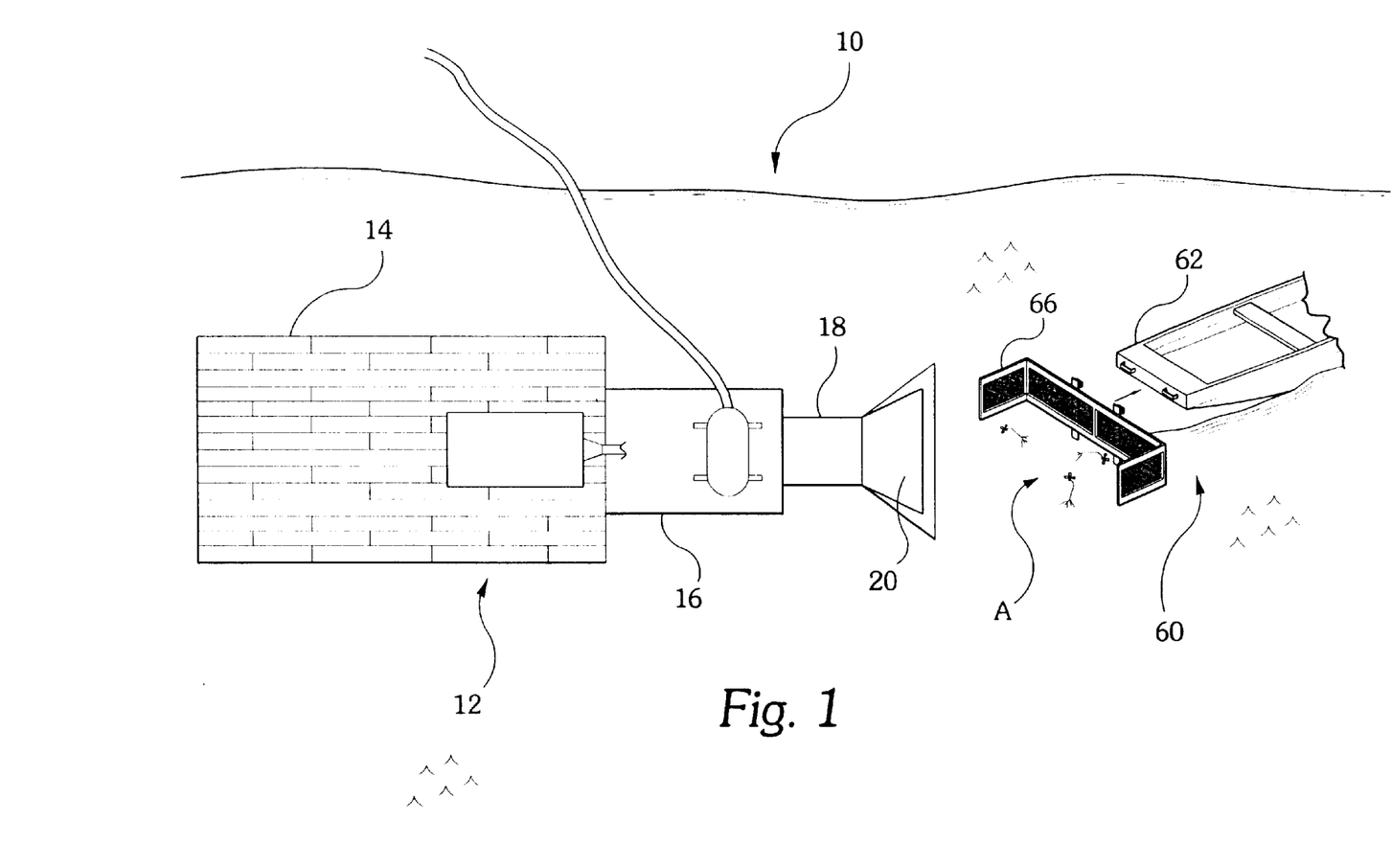
FIG. 1 is an environmental, perspective view of a water vegetation removal system according to the present invention.

FIG. 1 depicts an environmental view of the water vegetation removal system 10. The system includes a stationary barge apparatus 12 that essentially functions as a large water suction draw, and a cooperating water vegetation plow 60 for moving water vegetation A towards the barge apparatus 12, wherein the barge apparatus 12 floats in calm, shallow water. As shown in greater detail in FIG. 6, the vegetation plow 60, consists of a small outboard motor boat 62 having a bow 64 upon which a plow attachment 66 is mounted. The plow attachment 66 is shown to comprise a plurality of rectangular aluminum frames 68 with a wire mesh 70 occupying the center of the frames 68, the frames 68 being connected to form a substantially U-shaped plow attachment 66. Mounting braces 72 on the rear of the plow attachment 66 may be attached to the bow 64 of the motorboat 62 by a plurality of mounted C-clamps 74 or other mechanical fasteners.

Figure 2:
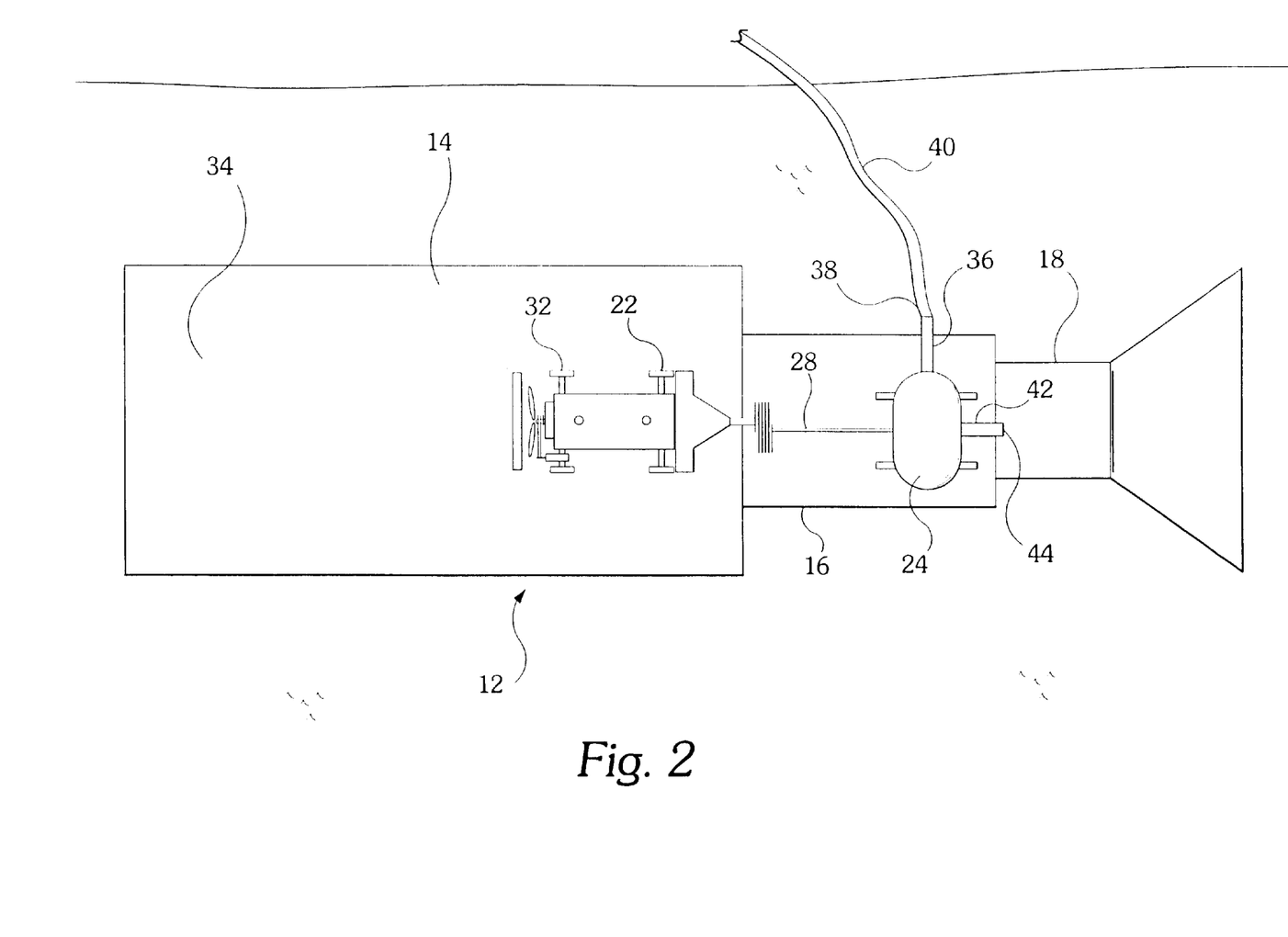
FIG. 2 is a diagrammatic plan view of the water vegetation removal system according to the present invention.
Figure 3:
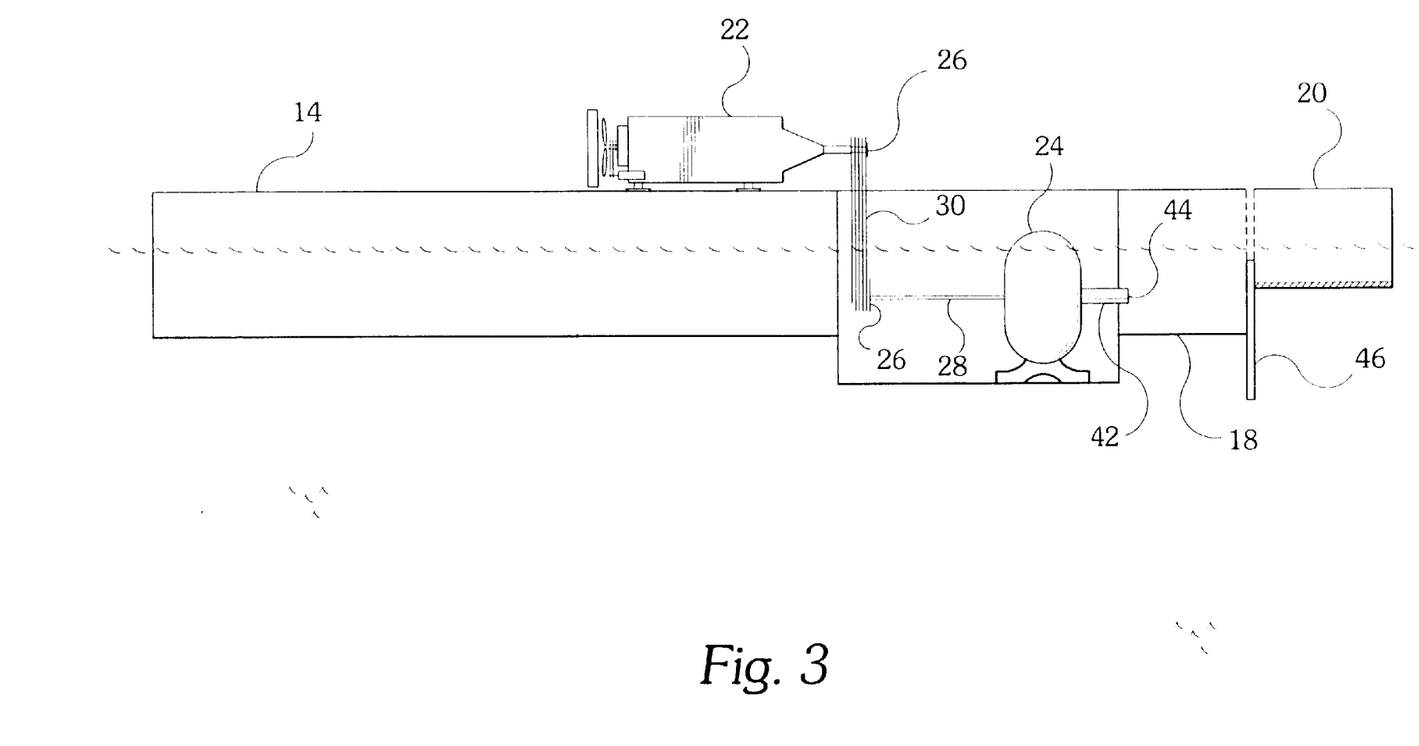
FIG. 3 is a diagrammatic side view of the water vegetation removal system according to the present invention, partly in section.

The preferred barge apparatus 12, depicted in FIGS. 2–3, has four main components connected end to end along their major axis consecutively from back to front as follows: a stationary barge 14, a pump box 16, a hopper box 18 (best seen in FIG. 4), and a water flow enhancement tray 20 (best seen in FIG. 5). Each segment of the barge apparatus 12 has a back end, and a front end, the front end of each segment being in the direction of the tray 20, and the back end being in the direction of the barge 14. Each segment also has a top surface (facing the sky), and a bottom surface (facing the water) connecting the front end to the back end. Each barge segment has a vertical port wall and a vertical starboard wall, the port wall being to the left and the starboard wall to the right as one faces the tray 20 from a reference point on the barge 14.

The barge 14 is the largest segment of the barge apparatus 12. The size of the barge 14 may vary depending on engine size. In a first embodiment, shown in FIGS. 1–3, a stationary engine 22 is mounted on the deck of the barge 14, preferably near the front end, while the remainder of the barge 14 is used for egress, equipment, fuel storage, an operator's comfort station, and other purposes. The barge 14 of the embodiment shown in FIGS. 1–3 preferably has dimensions 8' wide by 3' deep by 20' long, and preferably weighs approximately 5000 pounds. The barge 14 is preferably constructed from marine aluminum in order to reduce weight, to increase the system's longevity, and reduce maintenance, but may also be made from steel or other appropriate material. In alternative embodiments, the barge 14 can be longer or shorter in length, deeper or more shallow in depth, or more narrow in width. A width of 8' or less is critical for highway transport.

Although other type engines may be used, a stationary diesel engine 22, such as a Detroit 671, is mounted to the deck of the barge 14, and should have sufficient horsepower to drive a 6" dredge pump. A 6" dredge pump 24 is coupled to the engine 22. As shown in FIGS. 1–3, the coupling may be accomplished by pulleys 26 mounted on the engine shaft and the pump shaft 28 which are connected by V-belts 30. The engine mounting frame 32 is designed to raise or lower the engine assembly 22 to facilitate adjusting the pump drive belts 30. The engine 22 may be equipped with a PTO Transmission to adequately engage and disengage the pump drive belts 30. As stated previously, the back end 34 of the barge 14 preferably contains egress means (e.g. a ladder), equipment, a fuel storage compartment, and/or an operator comfort station. The barge 14 should comply with OSHA requirements, and include features such as handrails, equipment guards, a cover and safety walkways (not shown).

An open-topped rectangular pump box 16 is connected, preferably by welding, to the front end of the barge 14 such that the deck of barge 14 is substantially flush with the top of the walls of the pump box 16. The pump box 16 is preferably made of aluminum and supports a dredge pump 24 at the bottom of the pump box 16, near its front end and below the level of the base of the engine 22. The back end of the pump box 16, adjacent to the barge 14, contains the pump shaft 28, drive belts 30 and pulleys 26 connecting the pump 24 to the engine 22. The bottom, or floor, of the pump box 16, extends approximately one foot below the bottom of the barge 14. The preferred dimensions of the pump box are 4' wide by 4' deep by 7' long. The pump box 16 may be constructed with different dimensions to accommodate the size of the dredge pump 24.

The pump 24 features a 6" discharge port 36 with a quick connect coupler 38 to mate with another quick connect coupler fastened to a flexible, lightweight discharge hose 40, protruding from the port wall of the pump box. The pump 24 also features a six inch diameter suction pipe 42 at the pump intake port which protrudes through the front end of the pump box 16 into the back wall of the hopper box 18, and exits the pump box 16 below the surrounding water level. The suction pipe 42 is preferably seal welded to the pump box 16 wall at the pipe pass-through to prevent flooding of the pump box 16. Because the pump box 16 is at least partly below the surrounding water level, the pump 24 can be easily primed, and since the pump box 16 is dry, pump maintenance and inspection will not present a problem. A removable clean out inspection plate is built into the suction line near the pump to allow easy internal pump inspection. The pump box 16 also provides additional buoyancy to help offset the weight concentrated on the forward end of the barge 14. The pump box 16 may be fitted with a cover 17 (shown in phantom in FIG. 4) which may also provide a' walkway between the barge 14 and the hopper box 18.

A rectangular hopper box 18, which may be open-topped, is connected, preferably by welding, to the front face of the pump box 16. The hopper box 18 is preferably 3' wide by 3' deep by 3' long and is positioned such that its back face is centered, between the port and starboard side, on the front face of the pump box 16. The top of the walls of the hopper box 18 are flush with the top of the walls of the pump box 16. Passing through the back wall of the hopper box 18, adjacent the pump box 16, is a suction pipe 42 connected to the impeller or dredge pump 24. The pump suction line's open end 44 is located inside the hopper box 18, near its bottom. The purpose of the hopper box 18 is to provide a flow of water containing aquatic vegetation to the open end of the pump suction line 42.

Figure 4:
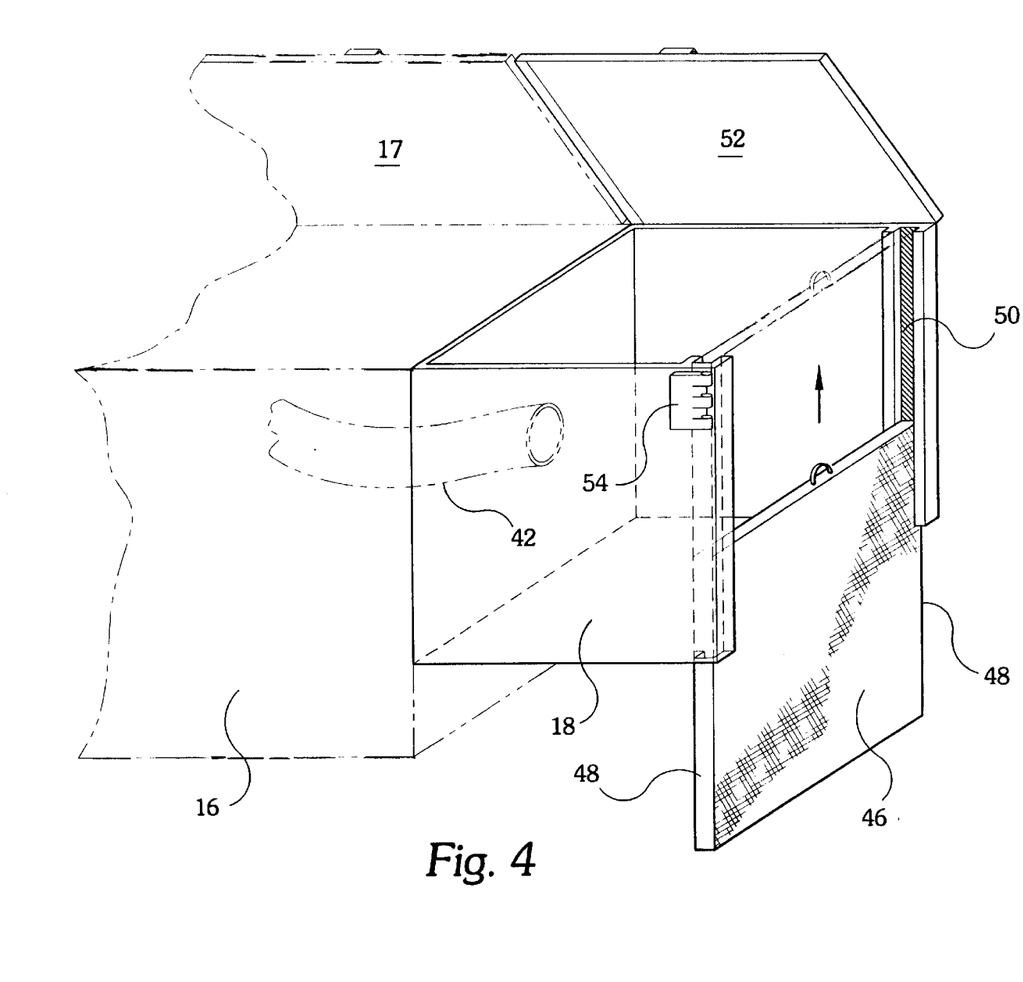
FIG. 4 is a perspective view of a hopper box with an adjustable gate.
Figure 5:
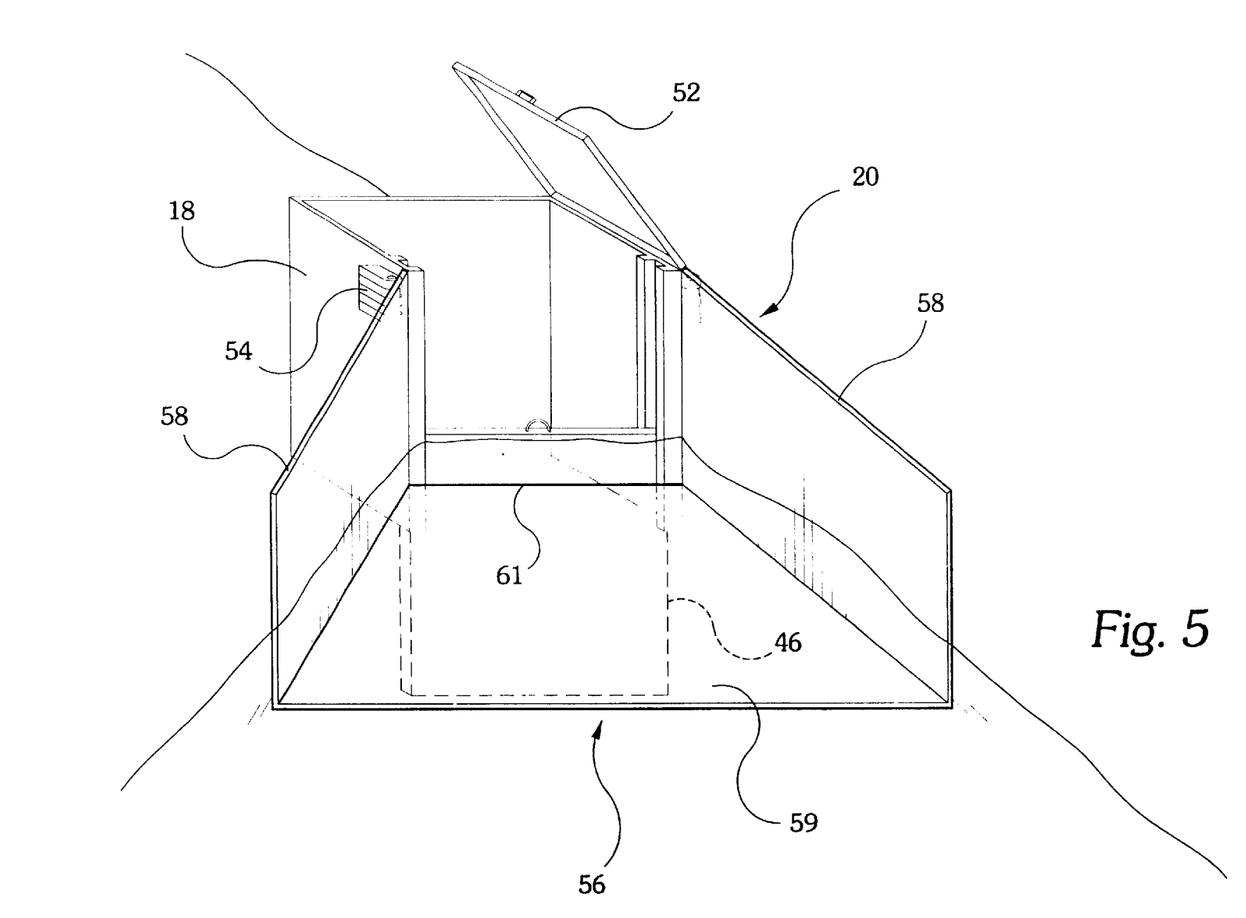
FIG. 5 is a perspective view of a water flow enhancement tray, partially submerged.

As shown in greater detail in FIG. 4, a vertically adjustable spillway gate 46 provides the front face of the hopper box 18. Gate 46 is an adjustable steel plate, preferably 3' wide and 3' deep, and having opposite side edges 48 seated within vertical tracks 50 disposed in the front port and front starboard inside walls of the hopper box 18. Gate 48 can be lowered below the surrounding water level, thereby admitting water into the hopper box 18 through the water flow enhancement tray 20. The hopper box 18 is preferably constructed from marine aluminum. In the preferred embodiment, expanded metal doors 17 and 52 open for maintenance and inspection and cover the top openings of the pump box 16 and the hopper box 18. The doors 17 and 52 provide a safe walk area for the barge operator.

An open-topped wedge-shaped water flow enhancement tray 20 is removably attached with vertical hinge pins removable from hinges 54 along the front corners of the hopper box 18. The mouth 56 of the tray 20 is its edge furthest from the barge 14. The tray 20 is open at the mouth 56. The back wall of the tray 20 is defined by the spillway gate 46, which may be raised or lowered. The sides of the tray 20 are defined by port and starboard side walls 58, which are hingedly attached to the front corners of the hopper box 18. The port and starboard side walls 58 of the tray 20 can be described as two vertical walls, preferably made from aluminum, that diverge towards the mouth 56 and have an aluminum bottom, or floor 59, that connects side walls 58. The tray is attached by hinges 54 to the vertical outboard corners of the hopper box 18. The tray walls 58, as viewed from above, diverge outward and away from the hopper box 18, like a truncated V, wherein the walls 58 serve as a funnel-shaped travel way for incoming vegetation. The tray walls 58 are preferably constructed of ⅛" thick by 2' deep by 4' long aluminum, disposed such that the depth is vertically-oriented. The top back corners of the tray walls 58 are positioned near the top front corners of the hopper box 18. The top of the tray walls 58 are preferably flush with the top of the walls of the hopper box 18. The lower corners of the tray walls 58 are partially submerged in the water, above the bottom of the hopper box 18. Disposing the tray 20 in this manner prevents aquatic vegetation from slipping over the tray walls 58 or under the aluminum floor 59 connecting the tray walls 58.

The tray walls 58 are preferably positioned by use of a stacked hinge 54, whereby one-half of the hinge 54 is welded to the inboard end of tray walls 58 in a vertical fashion, and the other half of the stacked hinge 54 is welded to the vertical outboard corner of the hopper box 18 in a vertical fashion. The tray 20 is removably connected to the hopper box 18 by inserting a pin into and through the matching hinge 54 holes, thereby securing the tray walls 58 in a vertical position to the outboard vertical corners of the hopper box 18. Adjacent to the adjustable spillway gate 46, the tray walls 58 are 3' apart, and the outer ends of the tray walls 58 may be referred to as the "mouth" of the barge apparatus The tray bottom or floor 59 is in contact with both tray walls 58, and is positioned level with the top of the spillway gate 46 when the spillway gate 46 is in the down or open position, in order to permit the flow of water and vegetation into the hopper box. The main function of the tray floor 59 is to provide a closed route for water and aquatic vegetation to make its way to the spillway gate 46. The floor 59 also adds stability to the tray walls 58. The tray floor 59 edge adjacent the hopper box 18 has a seal means, preferably a rubber gasket 61, to minimize any water draw between the hopper box 18 and the tray 20, thereby maximizing the draw into the hopper box 18. The flow of the water and aquatic vegetation through the tray 20 can be controlled by the operator changing the engine's 22 RPMs, or by raising or lowering the spillway gate 46.

The barge apparatus 12, having a total weight of approximately 10,000 pounds, may be partially disassembled for transport. That is, the tray 20 may be easily and conveniently removed by removing the hinge pins linking the tray 20 to the hopper box 18. A winch, crane or other means may be used to pull the barge from the water onto a ramp and trailer. The apparatus 12 may be transported overland by conventional means (truck or trailer) and launched in the subject water body. In areas where launching is difficult, a crane may be employed to lift the barge off the trailer and place it into the water.

Figure 6:
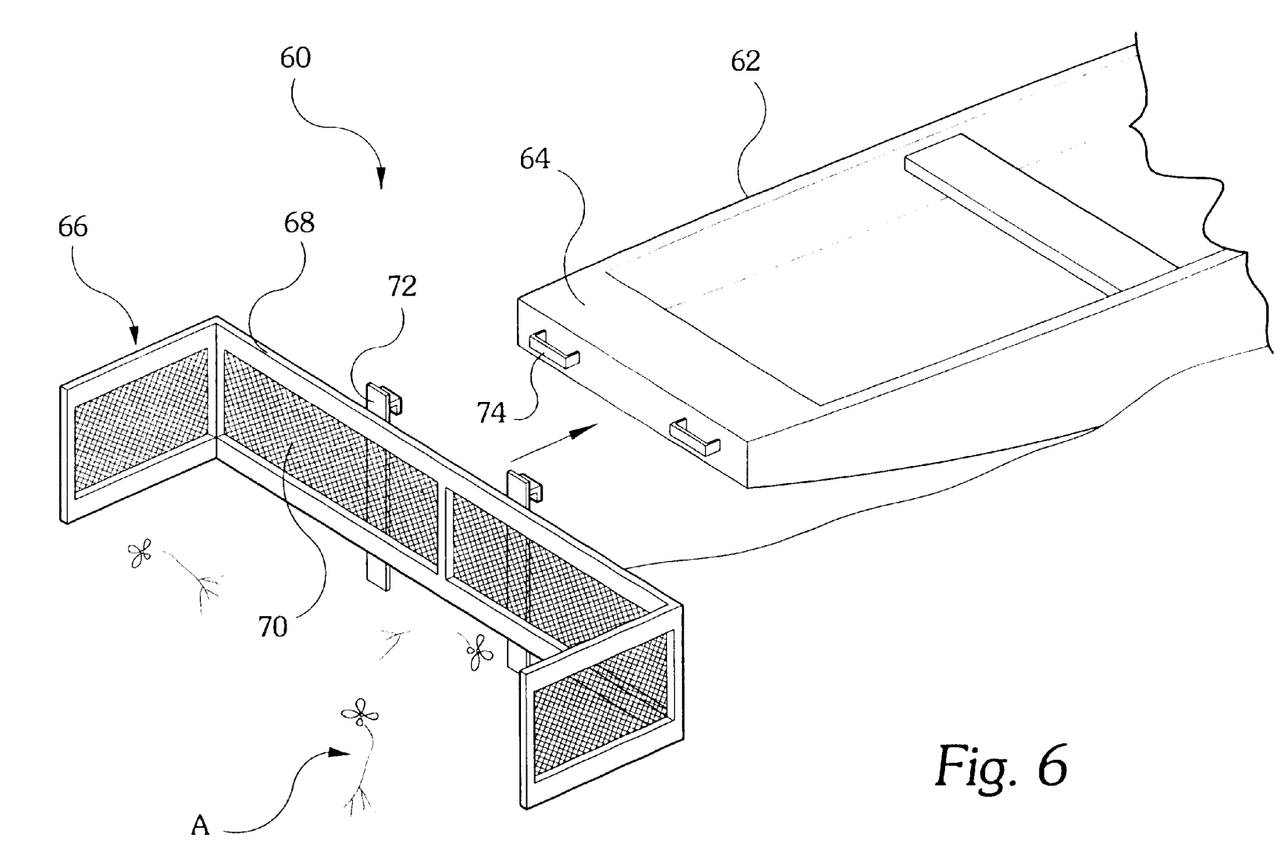
FIG. 6 is an exploded perspective view showing the attachment of a plow blade to an outboard motorboat according to the present invention.

FIG. 6 illustrates how the barge apparatus can be incrementally moved within the water body, when necessary, as well as the primary means to move the vegetation to the stationary barge apparatus. One or two powered Jon boats 62 can move the barge apparatus 12 to the appropriate area within the water body. The barge apparatus 12 is anchored by use of spuds attached to the barge, anchored by marine anchors, or tied off with rope to nearby trees or other structures. Once the barge is anchored in place, a 6" lightweight, transparent or translucent, plastic hose 40 having a flexible outer-ribbing, and a slick inner lining, is connected to the discharge port 36 of the dredge pump 24. Transparency or translucency is useful in order to efficiently address any clogging of the hose 40. The discharge end of flexible hose 40 is then routed to a convenient and suitable location on the bank in order to allow only discharged water to return to the water body, and prevent discharged vegetation from returning to the water body.

To operate the barge apparatus 12, the spillway gate 46 is opened and the hopper box 18, being positioned below the surrounding water level, fills with water. Suction forces created by the pump 24 and the suction pipe 42 draw down the water in the hopper box 18. Water flows over the spillway gate 46 to fill the void in the hopper box 18, creating a suction flow within the water flow enhancer tray 20. Any aquatic vegetation within the confines of the water flow enhancer tray 20 and near its mouth 56 is drawn toward and over the spillway gate 46, and into the hopper box 18 where the suction of the dredge pump 24 removes the vegetation mixed with water. The water and vegetation mix passes through the pump 24 where it is macerated and chopped by the impeller, discharged through the flexible hose 40, and deposited on the bank or, alternatively, into a crate or other such container located on the bank, for use as feed, fertilizer, etc.

To gather the vegetation, powered Jon boats 62, or "harvesting boats," are equipped with plow blades 66 attached to the bow 64 of the boat, preferably by two to four C-clamps 74 or other mechanical fasteners. The Jon boats 62 proceed to collect and push vegetation to the mouth 56 of the tray 20. When a sufficient amount of floating aquatic vegetation has collected at the mouth 56, the barge operator starts the main engine 22 and engages the pump 24. The next harvesting boat 62 delivers the next mat of vegetation to the mouth 56 and the operation continues, limited only by the number of harvesting boats 62 employed, until the operation has to be moved to a new location either because the vegetation in the immediate area has been depleted, or the discharge end of the flexible hose 40 has to be relocated. When a sufficient amount of the floating aquatic vegetation has been removed from the effected area, the operation is halted, and the barge 12 and equipment are secured and returned to the launch site for retrieval and deployment elsewhere.

Figure 7:
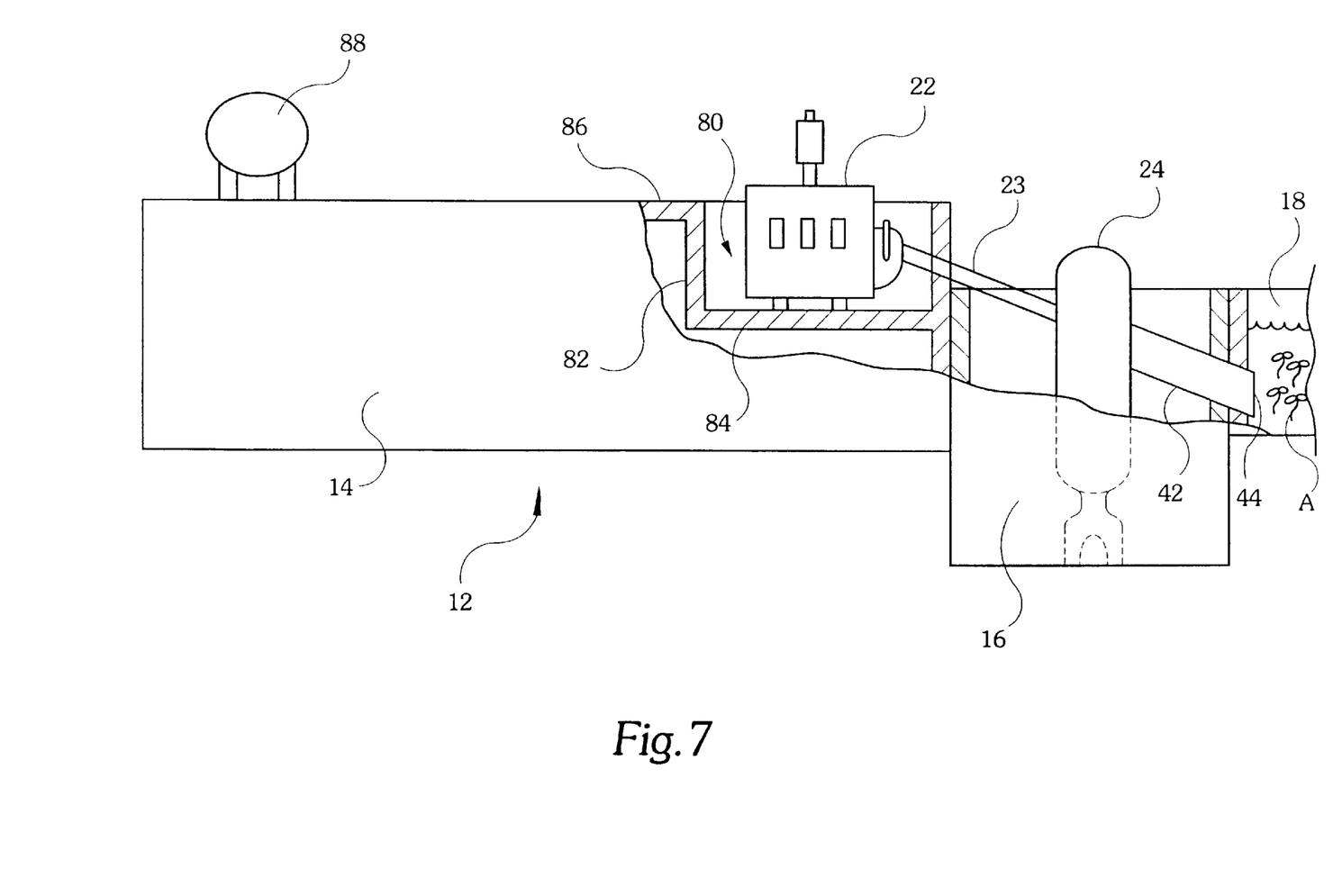
FIG. 7 is a fragmented, diagrammatic side view of an alternative embodiment of a harvesting barge according to the present invention, partly broken away and in section.

FIG. 7 shows an alternative embodiment of the barge apparatus 12. In this embodiment, the engine 22 is mounted in an engine compartment 80 countersunk in the barge 14 and defined by side walls 82 and a bottom wall 84 so that a substantial portion of the engine 22 is supported below the deck 86 of the barge 14. An engine 22 smaller than the Detroit 671 is used to reduce engine weight, as it has been found that the Detroit 671 produces more horsepower than required to power the motor or impeller of a dredge pump 24 having six inch diameter inlet and discharge ports. mounting the engine 22 in a compartment 80 countersunk below the level of the deck 86 lowers the center of gravity of the barge 14, making the barge 14 less top heavy and permitting the pump box 16 to be attached to the barge 14 below the barge deck level, making it easier to directly couple the engine 22 to the dredge pump 24 by a driveshaft 23 and universal joint couplings. The smaller engine size and reduced weight permit the overall dimensions of the barge 14 to be reduced, making the barge apparatus 12 easier to launch and safer to trailer and transport on highways and roads. Representative dimensions of the barge 14 shown in FIG. 7 may be about sixteen feet in length, eight feet in width, and two and one-half to three feet in depth. As before, a fuel tank 88, equipment storage, operator comfort station, and other accessory functions may be disposed on the middle and aft portions of the deck 86 of the barge 14.

It is to be understood that the present invention is not limited to the sole embodiments described above, but encompasses any and all embodiments within the scope of the following claims.

I claim:

1. A water vegetation collection and disposal system for the collection and disposal of noxious weeds and aquatic vegetation from streams and bodies of water, the system comprising:

a) a stationary barge apparatus;
   b) a dredge pump having an intake port and a discharge port, the pump being mounted on said barge apparatus;
   c) a suction pipe attached to the pump intake port of said dredge pump, the suction pipe having an open end, a suction draw being produced at the open end when said dredge pump is activated;
   d) a flexible discharge hose connected to the discharge port of said dredge pump;
   e) at least one motorboat having vegetation collection means for collecting aquatic vegetation and moving the vegetation into the suction draw produced by said dredge pump; and
   f) wherein aquatic vegetation is drawn into the suction pipe, macerated and chopped by said dredge pump, and discharged.

2. The water vegetation collection and disposal system according to claim 1, wherein said stationary barge apparatus further comprises:

a) a barge having a front end, a rear end, and a top deck;
   b) a pump box having a front end and a rear end, the rear end of the pump box being attached to the front end of said stationary barge, said dredge pump being mounted in said pump box;
   c) a hopper box having a front end and a rear end, the rear end of the hopper box being attached to the front end of said pump box, said suction pipe extending from said dredge pump into said hopper box through a watertight seal; and
   d) a water flow enhancement tray attached to the front end of said hopper box.

3. The water vegetation collection and disposal system according to claim 2, further comprising an engine coupled to said dredge pump for activating said pump.

4. The water vegetation collection and disposal system according to claim 3, wherein said engine is mounted on the top deck of said barge.

5. The water vegetation collection and disposal system according to claim 3, wherein said barge has an engine compartment defined therein countersunk below the level of the top deck, said engine being mounted in said engine compartment.

6. The water vegetation collection and disposal system according to claim 3, further comprising:

a) at least one engine pulley connected to said engine;
   b) at least one pump pulley connected to said dredge pump;
   c) at least one V-belt connecting said engine pulley to said pump pulley for driving said dredge pump.

7. The water vegetation collection and disposal system according to claim 3, further comprising a driveshaft directly connecting said engine to said dredge pump for driving said dredge pump.

8. The water vegetation collection and disposal system according to claim 2, wherein said pump box is a watertight chamber.

9. The water vegetation collection and disposal system according to claim 2, wherein said hopper box further comprises:

a) a pair of opposing side walls;
   b) a pair of vertical tracks mounted on said opposing side walls adjacent the front end of said hopper box; and
   c) a spillway gate slidably mounted in said vertical tracks, the position of said spillway gate being adjustable to admit water and vegetation into said hopper box.

10. The water vegetation collection and disposal system according to claim 2, wherein said water enhancement flow tray further comprises a pair of opposing side walls converging towards the front end of said hopper box for directing the flow of water and vegetation into said hopper box.

11. The water vegetation collection and disposal system according to claim 10, wherein said water enhancement flow tray further comprises a floor attached to the bottom edges of said sidewalls.

12. The water vegetation collection and disposal system according to claim 10, wherein said water enhancement flow tray further comprises a rubber gasket disposed between the floor of said water flow enhancement tray and said hopper box.

13. The water vegetation collection and disposal system according to claim 2, wherein said barge, said pump box and said hopper box are made from steel.

14. The water vegetation collection and disposal system according to claim 2, wherein said barge, said pump box and said hopper box are made from marine aluminum.

15. The water vegetation collection and disposal system according to claim 1, wherein said vegetation collection means comprises a plow attachment removably attached to a bow end of said motorboat.

16. The water vegetation collection and disposal system according to claim 15, wherein said plow attachment further comprises:
   a) a plurality of rectangular frames connected end to end in a substantially U-shaped configuration;
   b) wire mesh disposed in the center of each of said rectangular frames;
   c) a least one mounting brace attached to said plurality of rectangular frames.

17. The water vegetation collection and disposal system according to claim 16, further comprising at least one C-clamp attached to a bow end of said motorboat for removably attaching said mounting brace to said motorboat.

18. A method of operating a water vegetation collection and disposal system for removing weeds and aquatic vegetation from streams and bodies of water, comprising the steps of:
   a) providing an apparatus having a stationary barge, a watertight pump box attached to the barge and housing a dredge pump, a hopper box attached to the pump box and having the end of a suction pipe connected to the dredge pump opening into the hopper box, and a water flow enhancement tray having converging side walls defining a mouth of the apparatus and directing water flow to the hopper box;
   b) using at least one motorboat to position said apparatus in a body of water;
   c) attaching a discharge hose to said dredge pump;
   d) positioning a free end of said discharge hose on a bank adjacent to said body of water;
   e) plowing surface water vegetation towards the mouth of the apparatus using said at least one motorboat;
   f) lowering a spillway gate on said hopper box to admit water into said hopper box;
   g) activating said dredge pump to apply suction to said hopper box;
   h) suctioning water and vegetation into said suction pipe;
   i) macerating and chopping the vegetation in said dredge pump;
   j) discharging macerated vegetation and water on the bank adjacent to the body of water for processing and transport.

* * * * *